Nov. 19, 1940. E. T. GOVE Re. 21,626
SCRAPER
Original Filed July 30, 1934 2 Sheets-Sheet 1
Fig. 1
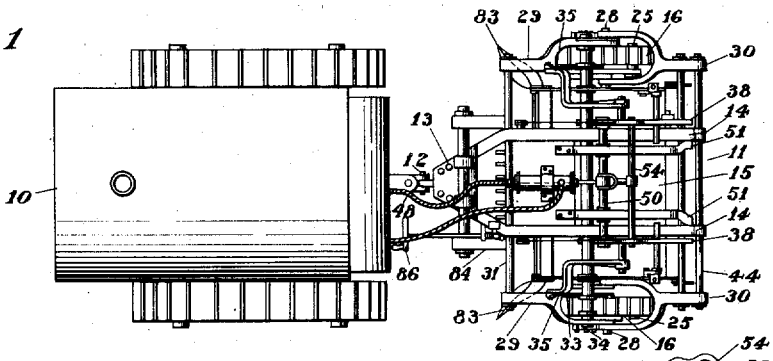
Fig. 2
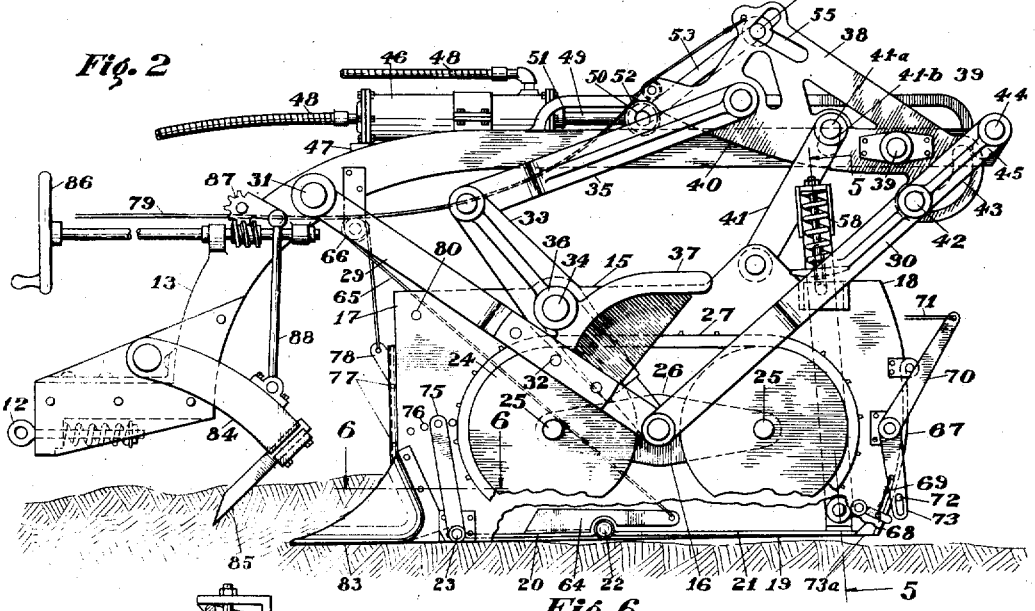
Fig. 5
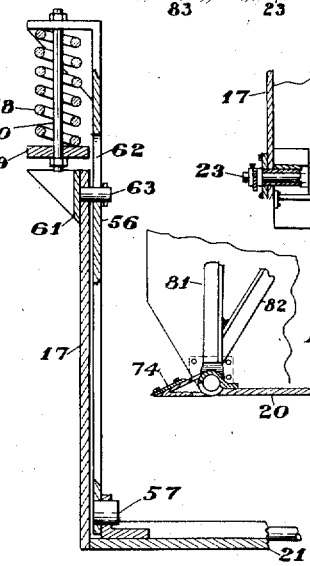
Fig. 6
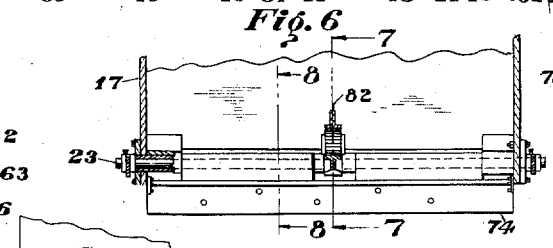
Fig. 7
Fig. 8
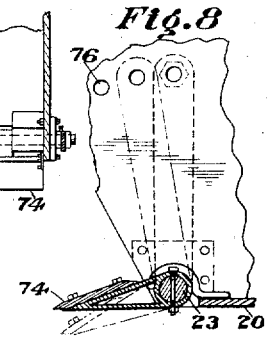
INVENTOR
Emery T. Gove Nov. 19, 1940. E. T. GOVE Re. 21,626

SCRAPER

Original Filed July 30, 1934 2 Sheets-Sheet 2

INVENTOR

Emery T. Gove

Reissued Nov. 19, 1940 Re. 21,626

UNITED STATES PATENT OFFICE 21,626

SCRAPER

Emery T. Gove, San Francisco, Calif.

Original No. 2,060,369, dated November 10, 1936, Serial No. 737,745, July 30, 1934. Application for reissue February 8, 1938, Serial No. 189,375

19 Claims. (Cl. 37—133)

This invention relates to scrapers and has for its principal object the provision of a scraper construction for moving earth wherein the relative positions of a scraper bowl and its supporting carriage may be varied in a novel manner.

A further object of the invention is to provide a scraper bowl having a supporting carriage connected with a draft frame adapted to be drawn by a tractor, the tractor providing power to vary relative positions of the carriage and bowl when in digging and carrying positions.

Another object is to provide a scraper bowl having a dump bottom, which bottom is operatively connected with the mechanism adapted to vary the position of the bowl and carriage.

Another object is to provide a scraper bowl having a dump bottom adapted to dump a load in forward and rearward directions.

Another object is to provide a scraper having a spring carried dump bottom.

Other objects will become apparent as my invention is more fully herein disclosed.

Referring to the drawings:

Fig. 1 is a plan view of my scraper attached to a tractor.

Fig. 2 is a side view of my scraper in digging position.

Fig. 5 is a detail of the spring tension on the scraper bottom along the lines 5—5 of Fig. 2.

Fig. 6 is a detail along lines 6—6 of Fig. 2.

Fig. 7 is a view along lines 7—7 of Fig. 6.

Fig. 8 is a view along lines 8—8 of Fig. 6 showing alternative positions of the mechanism therein disclosed.

Figure 3:
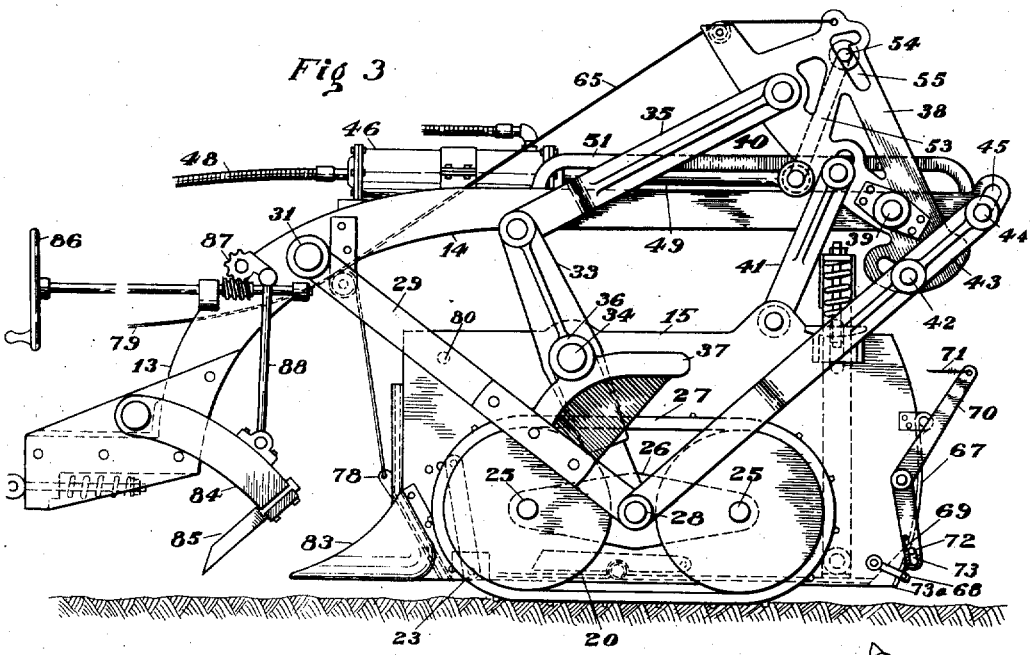
Fig. 3 is a side view of my scraper in carrying position.

In earth scraping mechanism of large capacity, it is desirable to move the same by tractor power to the end that large loads may be quickly gathered, uniformity of cut made and efficient dumping be provided.

In consequence, a tractor 10 is connected to a scraper 11 by means of a drawbar 12 which is affixed to the front and of a draft frame 13. The draft frame 13 is of U-shape having legs 14 adapted to hold a scraper bowl 15, carriages 16 for raising and lowering the bowl, together with other suitable operating mechanisms.

Referring more particularly to the construction of the bowl 15, the same is made of box-like form having side walls 17, an end wall 18, and a dump bottom 19. Dump bottom 19 is constructed of a front section 20, and a rear section 21, section 21 being of larger area than section 20, said sections being pivoted together by a rod 22 and pivotally connected with the side walls 17 by a rod 23 passing therethrough. Normally, when bottom 19 is closed, sections 20 and 21 are adapted to meet at a slight angle on rod 22 when bowl 15 is empty. Frame 13 is connected with bowl 15 and carriages 16 by mechanism adapted to vary the relative positions of the carriages with respect to the bowl whereby desired positions are obtained for the bowl.

Section 21 is normally about twice the area of section 20, as illustrated, which has a decided effect in dumping load because the major portion of the load being in section 21, the power required to lift the bottom is minimized.

As illustrated, carriages 16 are alike and comprise a pair of wheels 24, journalled at 25 on a support 26 and carrying an endless belt or caterpillar tread 27. A stub shaft 28 is centrally affixed to support 26 and extends on both sides of tread 27 to pivotally carry the ends of a forward yoke 29 and a rear yoke 30 and inasmuch as both sides of the scraper are constructed alike, a single description of like parts will suffice to disclose my invention.

The forward yoke 29 is pivotally connected to a crossbar 31 held on frame 13, said yoke being adjustable as to length by changing the positions of bolts 32, and on one side of yoke 29 is connected a cam-shape lever 37 forming part of the means whereby carriages 16 are elevated or depressed.

A telescopic lever 33 is journalled on each end of a cross shaft 34 fastened in the side walls 17 of bowl 15 and lever 33 has one end pivotally fastened to shaft 28, the other end being pivotally connected to a thrust bar 35 to the end that force exerted through bar 35 to lever 33 will be exerted on shaft 28 to effect relative movement of carriage 16 with respect to bowl 15, such movement resulting around lever 37 which contacts with a roller 36 mounted on the end of shaft 34.

The end of bar 35 is pivotally connected with a bell crank 38 journalled on a stub shaft 39 fastened to leg 14, said bell crank having a cam-shaped face 40 and being pivotally held by a strap 41 to the side wall 17, the pivotal connection to bell crank 38 including a stub shaft 41*a* adapted to rest in extreme forward position in a groove 41*b* in leg 14 to give proper support.

Rear yoke 30 is pivotally fastened to a transverse shaft 42 movable in a slot 43 in bell crank 38 and the movement of yoke 30 is limited by the same being pivotally fastened to a second transverse shaft 44 held in a slot 45 on the rear end of leg 14.

A hydraulic cylinder 46 containing the usual valves and piston, is mounted on a plate 47 supported between legs 14 to be supplied with power from tractor 10 through the pipes 48 whereby motion in both directions will be imparted to connecting rod 49.

Rod 49 is pivotally connected to a thrust shaft 50, slidably held near each end by a roller held between one of the guide bars 51 and a leg 14, and having on each end an outboard roller 52 adapted to contact with the cam face 40.

Shaft 50 is connected by a pull bar 53 to a rod 54 connecting both bell cranks 38 which rod works in a slot 55 whereby the bell cranks may be moved in a forward direction.

Bottom 19 is supported in the rear by a bar 56 held on a pivot 57 to the portion 21 at the lower end, the upper end being bent out to secure a spring 58 held between the bent out portion and a sliding plate 59 by a bolt 60 to the end that the opening of bottom 19 to dump will cause spring 58 to be compressed by the pressure of plate 59 against an abutment 61 fastened on side wall 17.

Relative movement of bar 56 is permitted by the provision of a slot 62 therein in which is guided a pin 63 fastened to side wall 17. The dumping of bottom 19 is effected through the medium of a lever 64 fastened to portion 20, which lever is connected by a cable 65 passing round a pulley 66 and tied to the forward end of bell crank 38 whereby power applied through cylinder 46 will cause the load to be dumped. Additional dumping mechanism is provided by making the end 18 with a liftable section 67 hinged thereto, the same being held closed by a latch 68 pivotally held on side wall 17 and connected through a spring 69 with one arm of a bell crank 70, the other arm being connected to the driver's seat of tractor 10 by a rope 71. Bell crank 70 is held to section 67 by a pin 72 thereon held in a slot 73 and the rearward end of portion 21 is adapted to slidably come within the edge of section 67 when closed to rest against a wedge-shaped transverse brace 73a having a forward cutting edge. A cutting edge 74 is secured to rod 23 within the walls 17 and adjustment is provided therefor by means of a lever 75 fastened to rod 23, which lever may be set in any one of a plurality of holes 76.

The lever 75 is formed with an opening adapted to register with the holes 76 upon swinging the lever about the axis of rod 23 to pivot the cutting edge about said axis, and a conventional bolt, as best indicated in Fig. 8, is adapted to pass through the hole in the lever and one of the holes 76 in register therewith, thus rigidly locking the lever and cutting edge against movement at any position of adjustment of the lever relative to the portion 20 of the bottom.

A front closure is provided for the bowl 15 by a gate comprising a sheet of metal mounted on rods 77, the ends of which slide in guides 78, the gate being raised or lowered by a rope 79 connected centrally of the gate to the tractor. A transverse brace rod 80 is connected to the side walls 17 and a vertical brace rod 81 is fastened thereto and to the rod 23. A brace 82 is welded to brace 81 and fastened to shaft 34.

Guides 83 serve to direct earth into bowl 15 outside of the line of progression of treads 27 to the end that tread 27 will always have comparatively level ground to run on when loading. A frame 84 is pivotally fastened to the draft frame 13 and supports a plurality of rooters 85 for the breaking of the earth for removal by bowl 15, and the cut of the rooters 85 is adjusted by a wheel 86 operating through a gear and lever 87 and a link 88.

In operation, in the loading position shown in Fig. 2, rod 49 extending from the cylinder 46 will be in such position that the bell cranks 38 will be in their extreme forward position whereby the thrust on levers 35 and pull on rear yokes 30 will have raised carriages 16 relative to the bowl 15 and the surface of the ground. Section 67 will be closed, bottom 19 will be closed and the front gate will be open.

On the forward progression of the tractor, the ground is broken by rooters 85 and the loose earth is guided by the parts 83 exteriorly of bowl 15, while the set or angle on edge 74 gives a desired bottom cut. Cable 65 is slack a predetermined amount and the bottom 19, as a whole, has a slight forward pitch relative to the line of progression of the scraper.

When a sufficient load has accumulated in bowl 15, cable 79 is released to close the front end of the bowl and power is applied to cylinder 46 whereby the thrust through rod 49 and shaft 50 causes rollers 52 to act on the cam faces 40 and elevate the front ends of bell cranks 38 and depresses the rear end thereof, all as illustrated in Fig. 3.

The movement of rod 49 is predetermined to the ends that the pull of levers 35 on levers 33 will be transmitted to shafts 28 to depress the same around cam levers 37, whereby carriages 16 will come in contact with the earth while bowl 15 will be elevated by relative change in position of shaft 34 with respect to shafts 28 and by pull of straps 41, the maximum elevation being governed by the length of slots 45.

Such elevation brings the bowl 15 into carrying position and the slack in cable 65 is taken up by the predetermined movement of bell crank 38, the position of bottom 19 with respect to the surface of the ground being sufficient for the loaded scraper to be transported to a place of dumping without engagement of the rooters 85, or edge 75, with the ground.

Figure 4:
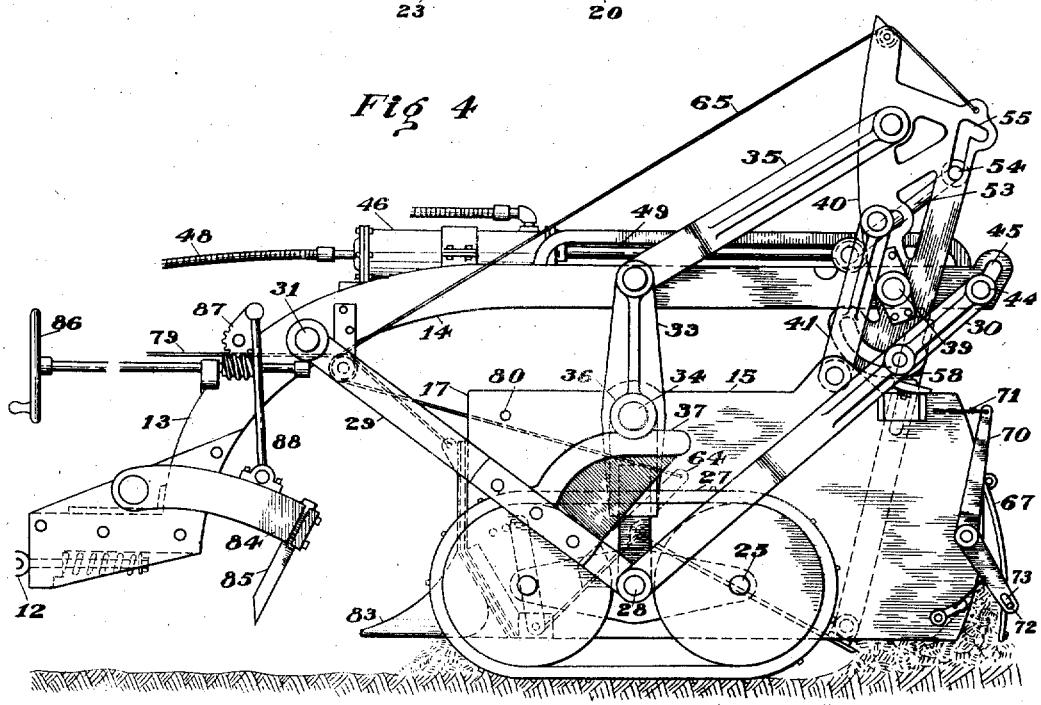
Fig. 4 is a side view of my scraper in dumping position.

When the dumping place has been reached, a further movement of rod 49 causes a further elevation of the front end of bell cranks 38 which in turn causes a further elevation of the bowl 15 by the mechanism described. At the same time the cable 79 has been pulled to open the front gate while power pull on cable 65 acts on lever 64 to pull bottom 19 into position illustrated in Fig. 4. Such position permits the major portion of the earth in bowl 15 to be dumped rearwardly of the scraper inasmuch as section 67 will have been opened, while a minor portion will be dumped forwardly. Continued forward motion of the scraper will spread the dirt while springs 58 will be placed under tension by the pull of cable 65.

It is obvious, of course, that the relative proportions of bottom sections 20, 21 may be varied, as desired for the particular job being done, since section 20 may carry the major portion of the dirt to dump the said major portion forwardly over the rigidly secured cutting edge 74. The adjustability of said cutting edge and the mounting movable therewith about the axis of rod 23 enables the blade having said cutting edge to be disposed in a generally vertically extending position to scrape over the dirt dumped forwardly over said cutting edge for leveling off said dirt.

The maximum elevation of bowl 15 and the maximum opening of bottom 19 are regulated by the slots 43, which positions are coincident with lever 33 in a vertical position. Upon discharge of bowl 15, a reversal or release of the pressure in cylinder 46 permits rod 49 to pull on lever 53 and release the pull on cable 65, whereupon bowl 15 may be brought back to carrying position as shown in Fig. 3 to be taken for further loading.

It will be noted that bottom 19 and edge 74 are demountable so that the machine may be used as a drag scraper. In this event the cutting edge is provided by the transverse brace 73*a* and section 67 is held closed to support the dragged load.

In setting the sections 20 and 21 at a slight angle to each other to form acute angles with the horizontal at the forward end of section 20 and the rear end of section 21, such positions insure that when some load has been accumulated in bowl 15, the rear end of section 21 will be pressed into place on transverse bar 73*a* to the end that no earth will be spilled, the tension of springs 58 being sufficient to return bottom 19 to the before-mentioned slightly angled position for loading.

It is, of course, obvious that treads 27 may be dispensed with and scraper bowl 15 be supported on wheels, but all such modifications come within the scope of the appended claims.

Having described my invention, I claim:

1. In a scraper, the combination of: a draft frame, carriages for the frame, a bowl mounted on the carriages, a sectional bottom in the bowl, means pivotally supporting the carriages on the frame, and actuating means pivotally connecting the frame, bowl and carriages arranged and adapted to first lower the carriages and raise the bowl upon partial actuation thereof and means connected to said sectional bottom and to said actuating means to open said bottom upon further actuation of said actuating means.

2. In a scraper, the combination of: a draft frame, a bowl, carriages attached to the bowl, levers pivotally connecting the carriages with the bowl, members connecting the carriages to the forward part of the frame, members connecting the carriages with the rearward part of the frame, bell cranks on the frame connected with said levers and said rearward members, means to move the bell cranks in two directions, and means on the forward members and means associated with said levers arranged and adapted to coact with the means on the forward members to vary the relative positions of the carriages and bowl upon movement of said bell cranks.

3. In a scraper, the combination of: a draft frame, a bowl, carriages on each side of the bowl, levers pivotally connecting the carriages with each side of the bowl, members connecting the carriages to the forward part of the frame, members connecting the carriages with the rearward part of the frame, bell cranks on the frame connected with the said levers and said rearward members, means connecting the rearward part of the bowl and said bell cranks, means to move the bell cranks in two directions, and means on the forward members and means associated with said levers arranged and adapted to coact with the means on the forward members to vary the relative positions of the carriages and bowls upon movement of said bell cranks.

4. In a scraper, the combination of: a draft frame, carriages pivotally connected to each side of the frame, bell cranks pivoted on the frame, means to operate the bell cranks, and a bowl pivotally connected to the bell cranks, and carriages; said bowl having a sectional bottom pivotally fastened to the front end of the bowl and means connecting a section to the bell cranks.

5. In a scraper, the combination of: a draft frame, carriages pivotally connected to the frame, bell cranks pivoted on the frame, means to operate the bell cranks, and a bowl pivotally connected to bell cranks and carriages having a sectional bottom comprising several sections pivotally connected together; a spring supporting one of said sections and the section adjacent thereto being pivotally connected to the bowl, and means connecting the last mentioned section to the bell cranks.

6. In a scraper, the combination of: a draft frame, carriages pivotally connected to the frame, bell cranks pivoted on the frame, means to operate the bell cranks, and a bowl connected to the bell cranks and carriages; said bowl having side walls, a bottom in sections and pivoted to the side walls at the front end, a transverse member connecting the side walls at the rear end adapted to receive the rear section of said bottom, a liftable rear end section, and means connecting the front section of the bottom to the bell cranks.

7. In a scraper, the combination of: a draft frame, carriages pivotally connected to the frame, bell cranks pivoted on the frame, means to operate the bell cranks, and a bowl pivotally connected to the bell cranks, and carriages; said bowl having side walls, a bottom in sections and pivoted to the side walls at the front end, a transverse member connecting the side walls at the rear and adapted to receive the rear section of the said bottom, a liftable rear end section, a liftable front end section, and means connecting the front section of the bottom to the bell cranks.

8. In a scraper, the combination of: a draft frame, carriages pivotally connected to the frame, bell cranks pivoted on each side of the frame, means to operate the bell cranks, and a bowl pivotally connected to the bell cranks and carriages; said bowl having side walls, a bottom in sections and pivoted to the side walls, at the front end, a transverse member connecting the side walls at the rear end adapted to receive the rear section of said bottom, a liftable rear end section, earth guides fastened to the front of the bowl, and means connecting a section of the bottom to the bell cranks.

9. In a scraper, the combination of: a draft frame, carriages pivotally connected to each side of the frame, bell cranks pivoted on the frame, means to operate the bell cranks, and a bowl pivotally connected to the bell cranks and the carriages; said bowl having side walls, a bottom in sections and pivoted to the side walls at the front end, a transverse member connecting the side walls at the rear end adapted to receive the rear section of said bottom, means to hold said rear section on said member when loading said bowl, a liftable rear end section, and means connecting the front section of the bottom to the bell cranks.

10. In a scraper, the combination of: a draft frame, carriages pivotally connected to each side of the frame, bell cranks pivoted on each side of the frame, means to operate the bell cranks, and a bowl pivotally connected to the bell cranks and carriages; said bowl having side walls, a bottom in sections and pivoted to the side walls at the front end, a transverse member connecting the side walls at the rear end adapted to receive the rear section of said bottom, a transverse cutting edge forward of the front section of the bottom, a liftable rear end section, and means connecting the bottom to the bell cranks.

11. In a scraper, the combination of: a draft frame, carriages pivotally connected to each side of the frame, bell cranks pivoted on the frame, means to operate the bell cranks, and a bowl pivotally connected to the bell cranks and carriages; said bowl having side walls, a bottom in sections and pivoted to the side walls at the front end, a transverse means connecting the side walls at the rear end adapted to receive the rear section of said bottom, an adjustable transverse cutting edge forward of the front section of the bottom, a liftable rear end section, and means connecting the bottom to the bell cranks.

12. In a scraper, the combination of: a draft frame, carriages pivotally connected to each side of the frame, bell cranks pivoted on the frame, means to operate the bell cranks, and a bowl connected to the bell cranks and carriages; said bowl having side walls, a bottom formed of two pivoted sections and having the front section pivotally connected to the front end of the side walls; a transverse means connecting the rear end of the side walls and adapted to receive the rear end of the rear section, spring carried devices adapted to hold said bottom closed, a liftable rear end section, a liftable front end section, earth guides fastened to the front of the bowl, and means connecting the bottom to said bell cranks.

13. In a scraper, the combination of: a draft frame, carriage adapted to support the frame on the ground, a bowl mounted on the carriage, means connecting the carriage with the frame, and means including a crank lever forming a connection between the frame, bowl and carriage for varying their relative positions with respect to the ground.

14. In a scraper, the combination of: a draft frame, a carriage pivotally connected to the frame, a crank device pivoted on the frame, means to operate said crank device, and a bowl pivotally connected to the crank device and carriage; said bowl having a sectional bottom pivotally fastened to the bowl and means connecting a section thereof to the crank device.

15. In a scraper, a bowl having side walls, means supporting said bowl for movement in one direction over the ground, a bottom including a generally horizontal cutting blade extending between the side walls adjacent the forward edges of the latter relative to said direction of movement of the bowl and a substantially horizontal plate extending from said blade rearwardly thereof, pivot means supporting said plate from the side walls for vertically swinging of the plate independently of said blade about a horizontal axis substantially parallel with and adjacent said blade, means for so swinging said plate whereby material supported thereon will be caused to move over said blade in the direction of movement of the bowl, and means connected with said blade arranged and adapted for moving said blade to a plurality of positions relative to horizontal independently of movement of said plate.

16. In a scraper having lateral side walls, a generally vertically disposed rear end wall, and a generally horizontally disposed bottom portion disposed forwardly relative to said end wall, a pair of earth guides projecting forwardly and oppositely outwardly of the forward edges of said side walls and of the forward edge of said bottom portion, means positioned rearwardly of said earth guides and adjacent the forward edge of said bottom portion pivotally supporting said bottom portion from said side walls and free from said rear wall for swinging said bottom portion vertically to various positions relative to said rear wall and side walls for unloading the dirt supported thereon to between said earth guides and over the forward edge of said bottom portion.

17. In a scraper, a bowl having a generally horizontally extending bottom, opposed lateral side walls, and an end wall, and the end of the bowl opposite said end wall being open, means for moving the scraper over the ground with the open end foremost, said end wall extending generally upwardly from the horizontally extending bottom and closing the rear end of the bowl, a cutting blade extending between the sides of the bowl and along the forward edge of said bottom, pivot means on the bowl pivotally mounting the forward end of said bottom for swinging the portion of the bottom adjacent and extending rearwardly of said forward end from a substantially horizontally extending position to a substantially vertically extending position for dumping earth adapted to be carried within the bowl and on said portion, means for so swinging said bottom, said pivot means being directly supported from said lateral side walls, and said cutting blade being carried on said pivot means.

18. In a scraper, a bowl having a generally horizontally extending bottom, opposed lateral side walls, and an end wall, and the end of the bowl opposite said end wall being open, means for moving the scraper over the ground with the open end foremost, said end wall extending generally upwardly from the horizontally extending bottom and closing the rear end of the bowl, a cutting blade extending between the sides of the bowl and along the forward edge of said bottom, pivot means on the bowl pivotally mounting the forward end of said bottom for swinging the portion of the bottom adjacent and extending rearwardly of said forward end from a substantially horizontally extending position to a substantially vertically extending position for dumping earth adapted to be carried within the bowl and on said portion, means for so swinging said bottom, said pivot means including a horizontally disposed shaft extending perpendicularly from each lateral side of the bowl, and said cutting blade being supported on said shaft for pivotal movement thereon.

19. In a scraper, a bowl having side walls, a generally vertically extending rear wall and a bottom; means supporting said bowl for movement over the ground with the end thereof opposite the rear wall foremost, means supporting said bottom substantially horizontal and extending between the side walls adjacent their lower edges for pivotal movement vertically within the bowl for dumping earth adapted to be supported thereon, said means including pivot means positioned adjacent the forward edges of the side walls arranged and adapted to support the forward end of the bottom from said side walls for swinging the portion of the bottom adjacent the forward edge of said portion and extending rearwardly toward the rear end of the bowl vertically between said side walls about a horizontal axis extending through said pivot means, power means connected with said portion operative for swinging said portion about said axis, whereby, upon actuation of said power means the said earth adapted to be supported on said portion will be dumped over the forward edge of said portion ahead of the bowl, said portion being movable for swinging about said axis independently of said rear wall.

EMERY T. GOVE.